United States Patent [19]

Smith et al.

[11] Patent Number: 5,098,150
[45] Date of Patent: Mar. 24, 1992

[54] VISOR COVER HINGE

[75] Inventors: Nels R. Smith, Holland; Thomas C. VandenBerge, Jenison, both of Mich.

[73] Assignee: Prince Corporation, Holland, Mich.

[21] Appl. No.: 634,473

[22] Filed: Dec. 27, 1990

[51] Int. Cl.⁵ ................................................ B60J 3/00
[52] U.S. Cl. ................................ 296/97.2; 296/97.5; 220/335; 16/291; 16/296
[58] Field of Search .................... 296/97.1, 97.2, 97.5, 296/97.6; 362/136, 137; 350/606; 49/386; 217/56; 220/335; 16/254, 267, 268, 291, 296, 225-227, 277

[56] References Cited

U.S. PATENT DOCUMENTS

| | | | |
|---|---|---|---|
| 667,838 | 2/1901 | Collins | 16/226 |
| 1,958,934 | 5/1934 | Williams | 296/97.6 X |
| 2,369,480 | 2/1945 | Mills | 16/382 X |
| 3,653,092 | 4/1972 | Shriner | 16/268 |
| 4,213,169 | 7/1980 | Kempkers | 362/74 |
| 4,227,241 | 10/1980 | Marcus | 362/61 |
| 4,760,503 | 7/1988 | VandenBerge et al. | 362/137 |
| 4,981,348 | 1/1991 | Prillard | 296/97.5 X |
| 4,997,228 | 3/1991 | Kempkers | 296/97.2 |

Primary Examiner—Dennis H. Pedder
Attorney, Agent, or Firm—Price, Heneveld, Cooper, DeWitt & Litton

[57] ABSTRACT

The present invention includes a spring clip hinge for pivotally attaching a cover to the body of a vehicle accessory such as a visor such that the cover is urged toward an open or a closed position. In a preferred embodiment of the invention the spring-clip hinge is an integral S-shaped member defining opposed sockets with one socket receiving the accessory body for mounting the hinge to the body, and the remaining socket cooperatively receiving the cover for urging the cover between open and closed positions.

38 Claims, 4 Drawing Sheets

VISOR COVER HINGE

BACKGROUND OF THE INVENTION

The present invention pertains to an over-center spring hinge mechanism for mounting a cover to a vehicle accessory and particularly one for use in connection with an automotive visor.

Automotive visors have incorporated an illuminated vanity mirror for several years. U.S. Pat. No. 4,227,241 discloses one such construction in which a cover is mounted to the mirror frame utilizing a pivot arm and an over-center spring arrangement for providing snap-open and closed operation of the cover. Other cover arrangements have also been employed including those shown in U.S. Pat. No. 4,213,169 which discloses a cover having a cam-shaped stub axle which cooperates with a socket in the mirror frame for camming the cover into an open or closed position. More recently, flat spring-type controls have been used with snap-on covers as disclosed for example in U.S. Pat. No. 4,760,503.

While all of these mounting configurations provide the desired cover control, they typically are used in connection with visors in which a molded polymeric frame is incorporated as part of the mirror construction. In such construction, the frame typically integrally must include the provision of a socket or axle for the cover mounting arrangement.

As cost and weight reduction becomes increasingly a more important design goal in the automotive industry, and in the design of automotive visors, and particularly visors incorporating high-end features such as a covered illuminated vanity mirror package, the utilization of a separate mirror frame and its associated mold tooling and materials costs, have made such construction, although attractive and functional, less desirable. Also, with modern vehicles, a cleaner appearance can be achieved by a cover with a so-called "close-on cloth" look and feel which is provided by a mirror cover which closes directly on an upholstered visor body. Further, some visors are now made with fiberboard cores as opposed to molded polymeric cores, to further reduce cost and weight.

The mounting of a cover to a fiberboard visor body which includes a covered but frameless illuminated vanity mirror package for the visor becomes problematic since there can be no socket for receiving a cover pivot axle. One solution to this problem has been proposed in U.S. patent application entitled MULTIPLE FUNCTION VISOR, Ser. No. 383,542, filed July 24, 1990, in which mounting posts are employed with configured ends to attach to the body of the visor which can be a molded polymeric material or any planar substrate material.

SUMMARY OF THE INVENTION

The system of the present invention improves upon the above-noted structure by providing a combined cover hinge and spring mechanism in which the cover can be mounted to a planar visor core member utilizing a relatively inexpensive spring-clip hinge which receives an axle extending from a cover to provide snap-open and closed operation of the cover against the visor to which the spring member is attached.

Apparatus embodying the present invention include a vehicle accessory with a cover and a spring-clip hinge for pivotally attaching the cover to the body of the accessory such that the cover is urged toward an open or a closed position. In a preferred embodiment of the invention the spring-clip hinge is an integral member which is a generally S-shaped member defining opposed sockets with one socket receiving the accessory body for mounting the hinge to the body, and the remaining socket cooperatively receiving the cover for urging the cover between open and closed positions. In one embodiment of the invention the accessory is a visor with a planar core and a pair of the hinge spring clips each includes arm means for attaching said spring clip to said visor core. In this embodiment the visor includes a mirror mounted to the core and a cover including pivot axles which snap-fit within the sockets of a pair of spaced hinges and cooperating with said axles for urging said cover between a closed position substantially parallel with and adjacent the visor body to an open position pivoted outwardly from said visor body. Such construction provides a relatively inexpensive and effective coupling of a visor cover to a planar visor core member with improved performance at a reduced cost.

These and other features, objects and advantages of the present invention, will become apparent by reading the following description thereof together with reference to the accompanying drawings in which:

DETAILED DESCRIPTION OF THE PREFERRED EMBODIMENT

Figure 1:
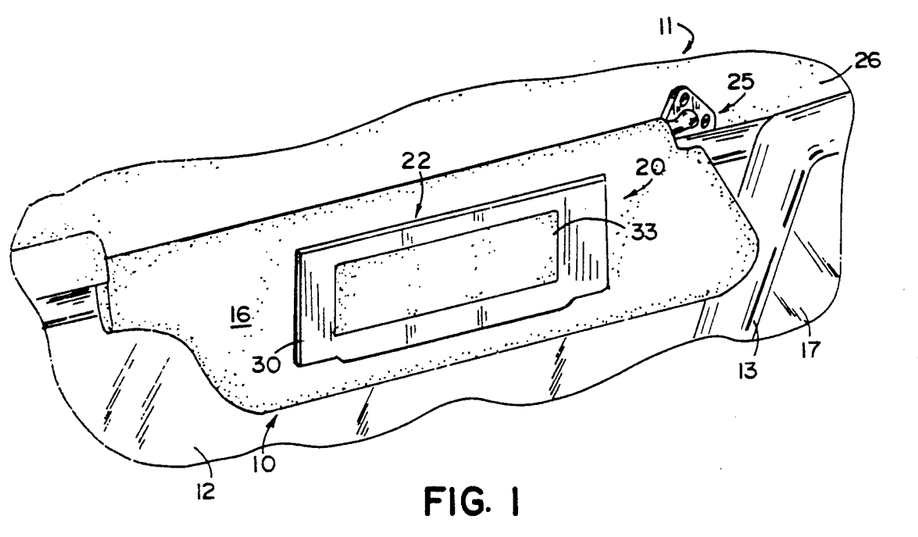
FIG. 1 is a fragmentary, perspective view of a vehicle accessory such as a visor embodying the present invention.
Figure 2:
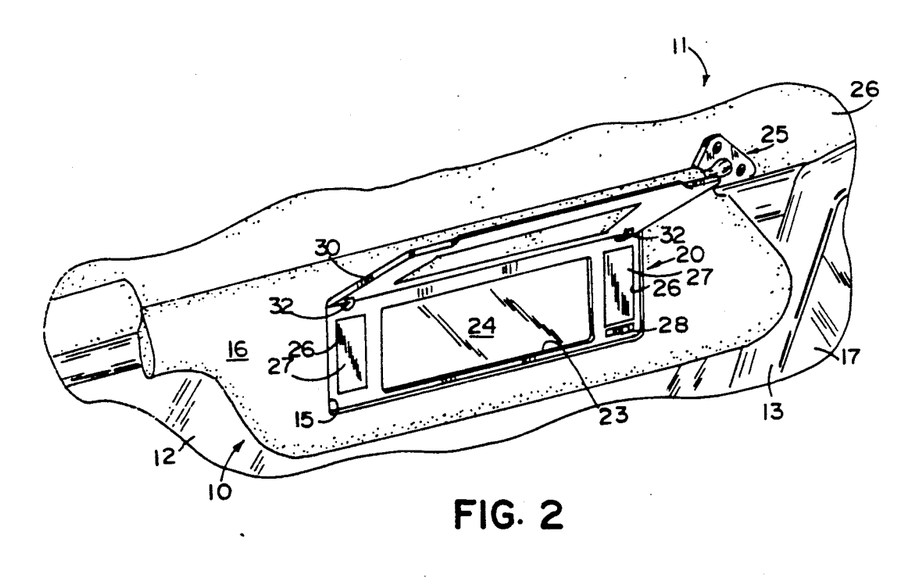
FIG. 2 is a fragmentary, perspective view of the visor shown in FIG. 1, showing the cover in an open position.
Figure 3:
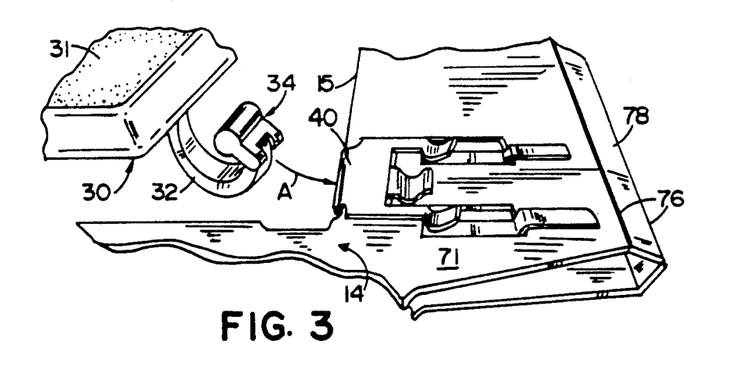
FIG. 3 is a fragmentary right side perspective view of the mounting structure for the cover to the visor core member.
Figure 4:
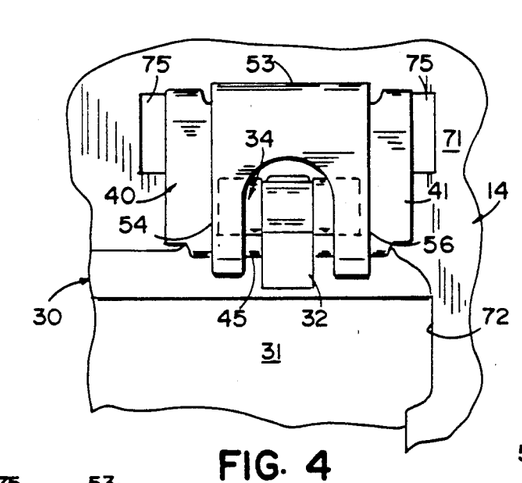
FIG. 4 is a rear elevational view of the assembled structure shown in FIG. 3, shown with the cover in the closed position.

Referring initially to FIGS. 1-3, there is shown a vehicle accessory such as a visor 10 embodying the present invention and installed in a vehicle such as an automobile 11 at the right front area adjacent the windshield 12 and the "A" pillar 13. The visor 10 includes a mounting assembly 25 for mounting the visor to the roof 26 of the vehicle for movement between a lowered use position illustrated and a raised stored position adjacent the roof. Conventionally, the mounting assembly also allows the visor to pivot from the windshield position shown to a position adjacent the side window 17. The visor includes a central core 14 (FIG. 3) which can be a folded planar material made of a polypropylene or, as in the preferred embodiment, a fiberboard material of the type disclosed in U.S. patent application Ser. No. 07/439,451, filed on Nov. 20, 1989 and entitled VISOR AND METHOD OF MAKING THE SAME; the disclosure of which is incorporated herein by reference. Core 14 includes a rectangular aperture 15 (FIGS. 2-4) for receiving an illuminated vanity mirror assembly 20 which includes a mirror and mirror frame 24 and 23, respectively, (FIG. 2), a pair of lenses 27 mounted with an aperture 26 on opposite sides of mirror 24, and a light control means such as a dimming switch 28 for controlling the intensity of light which is directed outwardly from the visor and focuses inwardly toward the face of a user. The assembly 20 includes lamp means positioned behind the lenses 27 and electrical wiring (not shown) for coupling the lamps and switch 28 to the vehicle's electrical system as disclosed in the above identified U.S. Pat. No. 4,760,503, the disclosure of which is incorporated herein by reference. The visor core 14 covered by suitable upholstery fabric 16 and the lighted mirror assembly 20 is covered by an independently mounted cover 30. The mounting of the mirror assembly 20 to the visor core 14 and within aperture 15 can be conventional such as by using mounting tabs which extend from around the mirror frame 23 toward the panel 78 (FIG. 3) forming one half of the folded core 14 and which engage the peripheral edge of aperture 15 to snap-fit the assembly 20 to the visor.

The cover 30 is independently mounted to the core 14 as best seen in FIGS. 3-7 by a pair of spring-clip hinges 40 which are mounted to the core 14 in spaced alignment with a pair of arms 32 on cover 30 and adjacent the upper edge of aperture 15 as viewed in FIG. 2 so it can be installed independently of the illuminated vanity mirror assembly 20. The pair of curved cover arms 32 (FIGS. 2-7) are snap-in received by the spring-clip hinges 40 of the present invention which are pre-installed on the visor core 14. Once hinges 40 are installed on the visor core, as described in greater detail below, the arms 32 of cover 30 snap-fit within the hinges which biases the cover 30 toward a snap-closed or snap-opened position as illustrated in FIGS. 1 and 2 respectively. Before describing the coupling of the cover to the spring-clip hinges 40, a description of one of the identical hinges 40 is presented in detail in connection with FIGS. 9-15.

Figure 7:
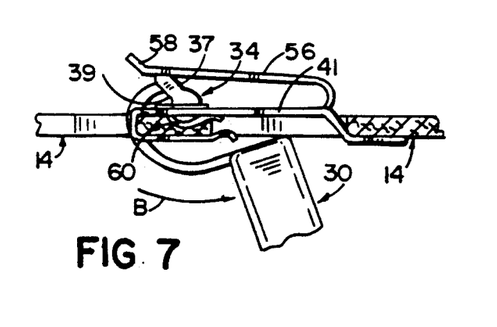
FIG. 7 is a right side elevational view of the structure shown in FIG. 6.
Figure 8:
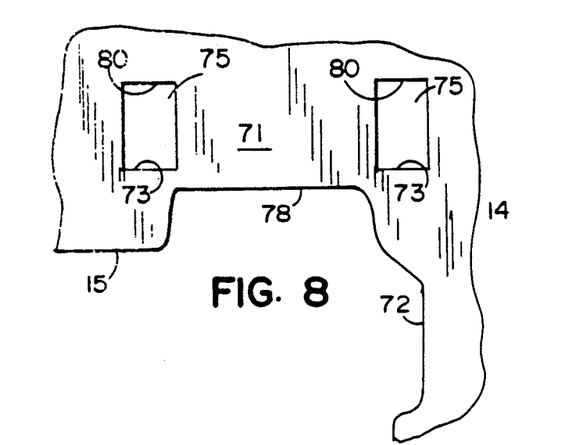
FIG. 8 is a fragmentary plane view of a portion of the core structure showing the apertures for receiving the spring-clip hinge embodying the present invention.
Figure 9:
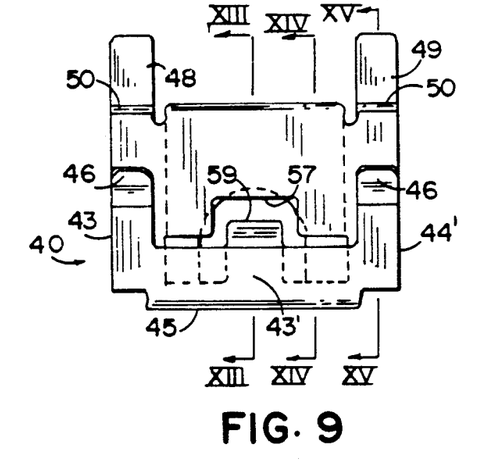
FIG. 9 is a front elevational view of the spring-clip hinge.
Figure 10:
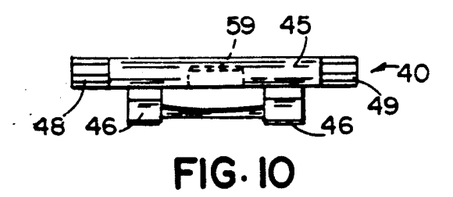
FIG. 10 is a bottom plane view of the structure shown in FIG. 9.
Figure 11:
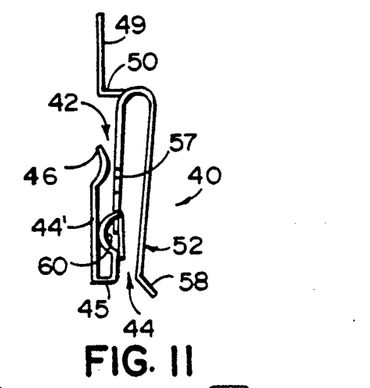
FIG. 11 is a right side elevational view of the structure shown in FIG. 9.
Figure 15:
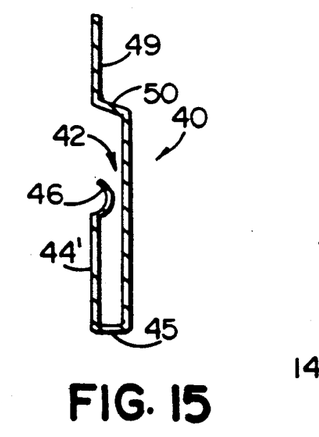
FIG. 15 is a cross-sectional view of the structure shown in FIG. 9 taken along section line XV—XV of FIG. 9.

Each spring-clip hinge 40 is generally S-shaped as viewed from the side as best seen in FIG. 11 which defines a pair of generally U-shaped opposing sockets 42 and 44 facing in opposite directions. The hinge integrally includes a central body 41 which is generally rectangular and which integrally includes a lower front U-shaped section including a pair of lower front arms 43 and 44' integrally joined to body 41 at base 45 as best seen in FIGS. 9 and 11 to define socket 42. The tips 46 of arms 43 and 44' are upwardly and inwardly curved in a semicircular configuration as best seen in FIG. 11 to assist in mounting the hinge to core 14 and securing it thereto as described below and shown in FIG. 16. The upward end of section 41 also includes a pair of spaced arms 48 and 49 which, as best seen in FIG. 15, extend outwardly and upwardly in an L-shaped bend 50 to lie in a plane substantially parallel with and in alignment with the plane of legs 43 and 44' for mounting the spring-clip hinges 40 to the core 14 as shown in FIGS. 3-8, described below.

Figure 12:
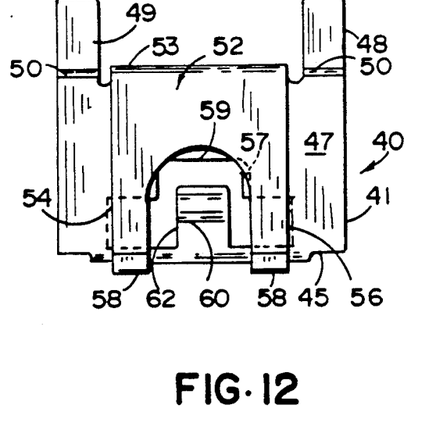
FIG. 12 is a rear elevational view of the structure shown in FIG. 9.
Figure 13:
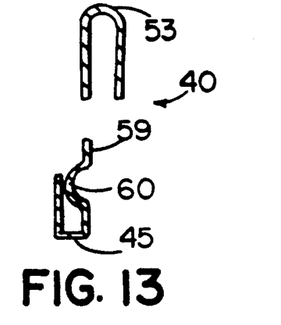
FIG. 13 is a cross-sectional view of the structure shown in FIG. 9 taken along section line XIII—XIII of FIG. 9.
Figure 14:
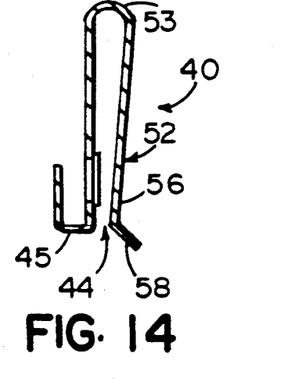
FIG. 14 is a cross-sectional view of the structure shown in FIG. 9 taken along section line XIV—XIV of FIG. 9.

The second or rear leg 44' of the generally S-shaped hinge 40 defines in cooperation with a curved central integral arm 60 extending upwardly from the lower edge of an inverted T-shaped cutout 57 in section 41 (as best seen in FIGS. 9, 11, and 12), a cover arm receiving socket 44. This socket is also defined in part by the surface 47 (FIG. 12) of section 41 and integral downwardly and outwardly curved generally U-shaped arm 52 integrally formed with section 41 at bend 53, as best seen in FIGS. 12 and 14. U-shaped arm 52 includes a pair of legs 54 and 56 which terminate in outwardly bent and downwardly inclined tips 58 for facilitating the insertion of the cover arms 32 within the socket 44 so defined.

Figure 16:
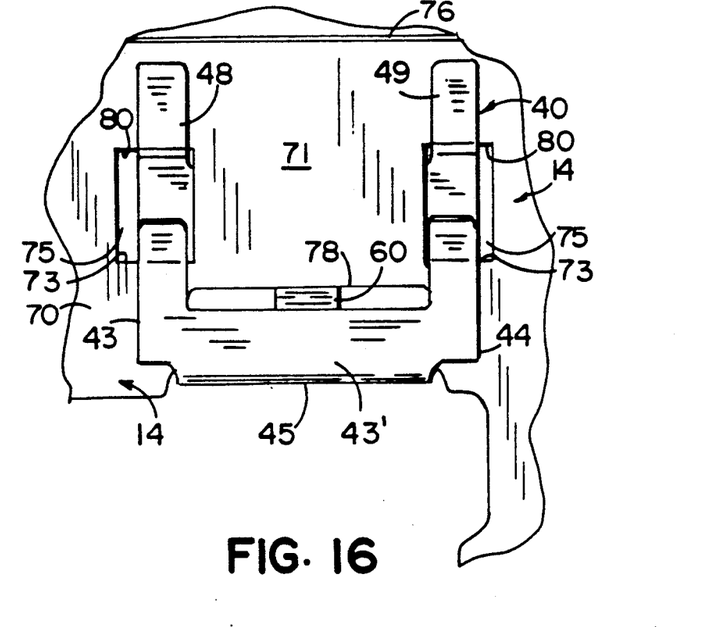
FIG. 16 is a front elevational view of the spring-clip hinge shown installed on a visor core member.
Figure 17:
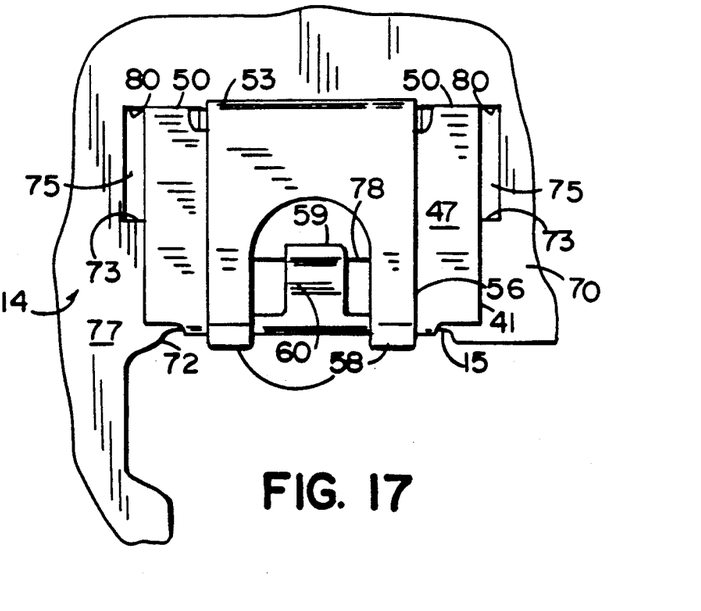
FIG. 17 is a rear elevational view of the structure shown in FIG. 16.

As can be seen by reference to FIGS. 16 and 17, hinge 40 compressibly engages the planar core member 14 with the tips 46 of arms 43 and 44 overlying an edge portion 70 (FIG. 8) of core 14. The generally rectangular aperture 15 includes at its upper corners a curved recess 72 and notch 78 for lockably receiving the spring-clip hinges 40. The tips 46 of arms 43 and 44' extend within and lockably engaging the lower edges 73 of a pair of rectangular apertures 75 formed in core member 14 in spaced relationship above notch 78 as best seen in FIGS. 8 and 16. The remaining legs 48 and 49 of hinge 40 extend under and behind section 70 of the core member 14 and upwardly through the rectangular apertures 75 with their tip as best seen in FIGS. 16 and 17 with the tip ends 48 and 49 overlying the surface 71 of core member 14 above apertures 75 near the fold line 76 of the folded core member 14, as best seen in FIG. 16. This effectively locks the spring clip to the planar visor core in secure relationship with respect thereto. To further secure the hinge however, the tip 59 of arm 60, as best seen in FIG. 17, engages the rear surface 77 of core member 14 near the edge of the rectangular notch 78 (FIG. 8). This also stabilizes the spring clip 40 hinge in place on the visor core.

Each hinge 40 is mounted to the visor core as shown in FIGS. 16 and 17 by aligning the U-shaped socket 42 with legs 48 and 49 extending upwardly through apertures 75 formed in the core member 14 at each of the two spaced locations to align the hinge 40 with the corresponding cover arm 32. The lower arms 43 and 44' are then slid over the section 72 of the core member 14 until the L-shaped bend 50 of arms 48 and 49 engage and set against the upper edge 80 of slot 75 as seen in FIGS. 16 and 17. With the spring-clip hinges 40 mounted to the visor core 14, the cover 30 can be snap-fitted within the remaining U-shaped socket 44 of the spring clip as described in connection with FIGS. 3-5. Before describing this operation however, a description of the cover arms 32 which serve as cam members in cooperation with the hinges 40, is presented.

Figure 5:
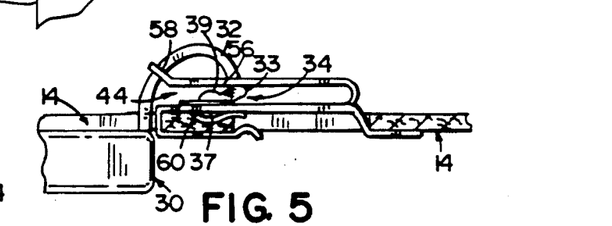
FIG. 5 is the right side elevational view of the structure shown in FIG. 4.
Figure 6:
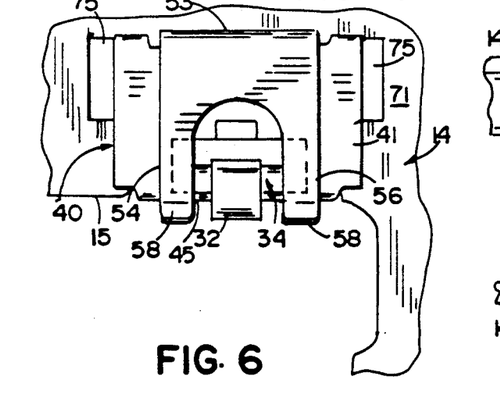
FIG. 6 is a rear elevational view of the structure shown in FIG. 4 with the cover in an open position.

As seen in FIGS. 2 and 3, the cover 30 includes a pair of arcuately curved arms 32, which curve upwardly and inwardly from the front surface 31 of the cover, which surface may include a decorative upholstered fabric 33 matching that of fabric 16 of the visor. Each arm 32 terminates in a cam member tip 34, which as best seen in FIGS. 3-7 comprises a somewhat elongated curved body as viewed from the side. The cover 30 is installed once clip 40 is mounted to the core member 14 by pushing the arm 32 in a direction indicated by arrow A in FIG. 3, under the surface 71 of the core and into the sockets 44 which guideably receives the cam 34 with the assistance of the upwardly curved tips 58. It is noted, for purposes of illustrating this assembly, FIG. 3 is inverted from the structure shown in FIGS. 4-6 to show the front side of the visor during the installation process. The cover is pushed inwardly until the rounded cam member 34 snap-locks and nests within the curved cam receiving socket 62 of the center arm 60 extending upwardly from base 45 as best seen in FIGS. 11 and 12. In this position, the cam member is compressibly gripped between the legs 54 and 56 and section 41 to provide a significant compressive force against the cam member tending to hold it in a cover-closed position as shown in FIG. 5 or cover-open position as shown in FIG. 7. In the cover-closed position, surface 37 of cam 34 engages the surface member 41 facing arms 54 and 56 while the opposite surface 39 of cam 34, engages the inner surface of arms 54 and 56 as best seen in FIG. 5. The spring bias force of arms 54 and 56 with the left end 37 of cam member 34 engaging member 41 as shown in FIG. 5 and the right end of member 34 spaced from end 37 provides a camming action holding the cover in a closed position with the edges of the cover 30 engaging the upholstery 16 of the visor as shown in FIG. 1. As can be appreciated, the pivot axis for the cover is aligned generally with the center line of the socket 62 formed in arm 60. As the cover is opened as illustrated by arrow B in FIG. 7, the position of cam member 34 reverses with surface 39 now engaging section 41 of plane 40 while the surface 37 of cam 34 engages arm 56. Again, the contact point at opposite ends of the curvilinear cam member 34 provides the torque in connection with the compressive force of arms 54 and 56 against cam member 34 for holding the cover in an open position as illustrated in FIGS. 2 and 7.

Thus the spring-clip hinge of the present invention, cooperates with the planar visor core member 14 and the snap-in cover 30 to provide an over-center biasing force on the cover for holding it in a closed or open position. Once the cover has been snapped into the pair of spaced hinges 40, mounted in a pair of spaced configured apertures on each edge of the rectangular aperture 15 of the visor core member 14, the mirror package can be installed utilizing suitable snap-in fasteners. The core member 14 is covered with a suitable upholstering such as padded fabric 16 applied to the visor and the core folded and locked together to complete the visor in a manner as described in the above-identified U.S. patent application Ser. No. 439,451.

The spring-clip hinge employed in the present invention is made by a progressive die and stamped into the configuration shown utilizing a suitable spring steel material which can be treated for rust inhibition in a conventional manner. In the preferred embodiment of the invention, the spring member 40 was a 1074 steel having a thickness of about 0.014 inches and which was conventionally heat and surface treated to a Rockwell C hardness of 45-50. Thus the system of the present invention provides an easily assembled relatively inexpensive covered visor construction in which the hinge and camming mechanism is an integral spring clip which can be lockably attached to a configured aperture in a planar core member. The hinge defines a spring biased socket which snap receives a cover having a cam means thereon for camming the cover in snap-open or snap-closed position in response to the spring clip bias force.

It will become apparent to those skilled in the art that various modifications to the preferred embodiment described herein can be made without departing from the spirit or scope of the invention as defined by the appended claims.

The embodiments of the invention in which an exclusive property or privilege is claimed are defined as follows.

1. A visor for a vehicle which includes a vanity mirror comprising:
   a visor body including a generally planar core with a plurality of openings formed therein, said body including a mirror mounted thereto;
   a cover for said mirror; and
   a hinge for pivotally mounting said cover to said core adjacent an edge of at least one of said openings for urging said cover between a closed position and an open position, said hinge comprising an integral generally S-shaped spring clip member defining a pair of opposed sockets with one of said sockets including spaced leg means for extending into said plurality of openings for lockably securing said hinge to said core and the remaining socket shaped to compressively receive and hold said cover for pivotally mounting said cover to said visor.

2. The apparatus as defined in claim 1 wherein said cover includes a pivot arm having cam means for cooperatively engaging said remaining socket of said hinge for urging said cover toward an open or closed position.

3. The apparatus as defined in claim 2 wherein said generally S-shaped hinge includes a center section and said spaced leg means includes a first pair of spaced legs extending from one end of said center section to define said one socket.

4. A visor for a vehicle which includes a vanity mirror comprising:
   a visor body including a generally planar folded core with an opening formed in one side for exposing a mirror, said body including a mirror mounted thereto;
   a cover for said mirror; and
   a hinge for pivotally mounting said cover to said core adjacent an edge of said opening for urging said cover between a closed position and an open position, said hinge comprising an integral generally S-shaped spring clip member defining a pair of opposed sockets with one of said sockets being lockably mounted to said edge of said opening for securing said hinge to said core and the remaining socket shaped to cooperatively receive said cover for pivotally mounting said cover to said visor;
   wherein said spring clip includes a center section and a first pair of spaced legs extending from one end of said center section to define said one socket and wherein said cover includes a pivot arm having cam means for cooperatively engaging said remaining socket of said hinge for urging said cover toward an open or closed position; and wherein said spring clip further includes a second pair of spaced legs extending from at an end of said center section opposite said one end, wherein at least portions of said second pair of spaced legs lie in substantially the same plane as portions of said first pair of legs for engaging the same side of said core.

5. The apparatus as defined in claim 4 wherein said spring clip further includes at least one leg extending from said end of said center section opposite said one end for defining said remaining socket.

6. The apparatus as defined in claim 5 wherein said arm of said cover is curved such that said cam means at an end thereof extends within said remaining socket of said hinge.

7. The apparatus as defined in claim 6 wherein said spring clip further includes an arm extending from the junction of said first pair of legs and said center section and including a socket aligned to receive said cam means of said cover arm such that said cam means is compressively held in said socket between said arm and said center section.

8. The apparatus as defined in claim 7 wherein said spring clip is a spring steel member.

9. The apparatus as defined in claim 8 wherein said visor body is made of a substantially thin formable material.

10. The apparatus as defined in claim 9 wherein said body includes a pair of spaced apertures extending in spaced relationship adjacent and in spaced relationship to said edge of said opening in said body for receiving at least said second pair of legs of said spring clip therethrough.

11. The apparatus as defined in claim 10 wherein said first pair of legs of said spring clip include ends which respectively extend into said pair of apertures.

12. The apparatus as defined in claim 11 wherein said arm of said spring clip includes an end which engages an edge of said opening of said planar body.

13. The apparatus as defined in claim 12 wherein said visor includes means for illuminating said vanity mirror.

14. The apparatus as defined in claim 13 wherein said first and second pairs of legs of said spring clip extend in engagement with appropriate sides of said pair of apertures of said body for locking said spring clip to said body.

15. A vehicle accessory cover mounting assembly comprising:
a vehicle accessory including a plurality of spaced mounting apertures;
a cover for said accessory; and
a hinge for pivotally mounting said cover to said vehicle accessory and for urging said cover between a closed position and an open position, said hinge comprising a generally S-shaped member defining a pair of opposed sockets with one of said sockets including leg means having off-set sections for respectively extending into said apertures for securing said hinge to said accessory and the remaining socket shaped to cooperatively receive said cover for pivotally mounting said cover to said accessory.

16. The apparatus as defined in claim 15 wherein said cover includes a pivot arm having cam means for cooperatively engaging said remaining socket of said hinge for urging said cover toward an open or closed position.

17. The apparatus as defined in claim 16 wherein said generally S-shaped member includes a center section and said leg means includes a first pair of spaced legs extending from one end of said center section to define said one socket.

18. A vehicle accessory cover mounting assembly comprising:
a vehicle accessory;
a cover for said accessory; and
a hinge means for pivotally mounting said cover to said vehicle accessory and for urging said cover between a closed position and an open position, said hinge means comprising a generally S-shaped hinge defining a pair of opposed sockets with one of said sockets being mounted to said vehicle accessory for securing said hinge to said accessory and the remaining socket shaped to cooperatively receive said cover for pivotally mounting said cover to said accessory;

wherein said generally S-shaped hinge includes a center section and a first pair of spaced legs extending from one end of said center section to define said one socket and wherein said cover includes a pivot arm having cam means for cooperatively engaging said remaining socket of said hinge for urging said cover toward an open or closed position and wherein said accessory includes aperture means for lockably receiving said generally S-shaped hinge; and wherein said hinge further includes a second pair of spaced legs extending from an end of said center section opposite said one end, wherein at least portions of said second pair of spaced legs lie in substantially the same plane as portions of said first pair of legs for engaging a side of said vehicle accessory.

19. The apparatus as defined in claim 18 wherein said hinge further includes at least one leg extending from said end of said center section opposite said one end for defining said remaining socket.

20. The apparatus as defined in claim 19, wherein said arm of said cover is curved such that said cam means at an end thereof extends within said remaining socket of said hinge.

21. The apparatus as defined in claim 20 wherein said hinge is a spring clip.

22. The apparatus as defined in claim 21 wherein said hinge further includes an arm extending from the junction of said first pair of legs and said center section and including a socket aligned to receive said cam means of said cover arm such that said cam means is compressively held in said socket between said arm and said center section.

23. The apparatus as defined in claim 22 wherein said vehicle accessory includes a generally planar body to which said hinge attaches.

24. The apparatus as defined in claim 23 wherein said body includes a central opening and a pair of spaced apertures extending in spaced relationship adjacent and in spaced relationship to an edge of said central opening for receiving at least said second pair of legs of said hinge therethrough.

25. The apparatus as defined in claim 24 wherein said first pair of legs of said hinge include ends which extend into said pair of apertures.

26. The apparatus as defined in claim 25 wherein said arm of said hinge includes an end which engages an edge of said central opening of said planar body.

27. The apparatus as defined in claim 26 wherein said vehicle accessory is a vehicle visor.

28. The apparatus as defined in claim 27 wherein said visor includes a vanity mirror and said cover is positioned to cover said mirror.

29. The apparatus as defined in claim 28 wherein said visor includes means for illuminating said vanity mirror.

30. The apparatus as defined in claim 29 wherein said first and second pairs of legs of said hinge extend in engagement with opposite sides of said pair of apertures of said body for locking said hinge to said body.

31. An integral hinge for mounting a cover to a vehicle accessory comprising:

a generally S-shaped integral spring clip defining a pair of opposed sockets with one of said sockets defined by first leg means extending from one end of a center section of said clip, said clip including second leg means extending from an opposite end of said center section, and wherein the remaining socket is defined by third leg means extending from said opposite end of said center section on a side of said center section opposite said first and second leg means, said third leg means and said center section shaped to compressively receive a cover mounting member for pivotally mounting a cover to a vehicle accessory.

32. The apparatus as defined in claim 31 wherein said first leg means comprises a pair of spaced legs.

33. The apparatus as defined in claim 32 wherein said second leg means comprises a pair of spaced legs and wherein at least portions of said second pair of spaced legs lie in substantially the same plane as portions of said first pair of legs.

34. The apparatus as defined in claim 33 wherein said spring clip further includes an arm extending from the junction of said first leg means and said center section and includes a socket aligned for receiving cam means of a cover arm to hold the cam means compressively in said socket between said arm and said third leg means.

35. The apparatus as defined in claim 34 wherein said hinge is a spring steel member.

36. The apparatus as defined in claim 35 wherein said legs of said first leg means include ends which respectively engage apertures in the vehicle accessory for mounting said hinge to the accessory.

37. The apparatus as defined in claim 36 wherein said second leg means include L-shaped legs.

38. The apparatus as defined in claim 37 wherein said arm of said spring clip includes an end which engages the vehicle accessory to assist in mounting said hinge to the accessory.

* * * * *

UNITED STATES PATENT AND TRADEMARK OFFICE
CERTIFICATE OF CORRECTION

PATENT NO. : 5,098,150

DATED : March 24, 1992

INVENTOR(S) : Nels R. Smith et al.

It is certified that error appears in the above-identified patent and that said Letters Patent is hereby corrected as shown below:

Column 7, Claim 14, Line 46:
"appropriate" should be --opposite--.

Signed and Sealed this

Twenty-eighth Day of September, 1993

Attest:

BRUCE LEHMAN

Attesting Officer

Commissioner of Patents and Trademarks